(12) United States Patent
Springsted et al.

(10) Patent No.: US 7,084,103 B1
(45) Date of Patent: Aug. 1, 2006

(54) METHODS OF PREPARATION OF ETHOXYLATED PHENOLIC COMPOUNDS, COMPOSITIONS CONTAINING THE SAME AND RELATED METHODS

(75) Inventors: Perry Springsted, Sewell, NJ (US); Lisa Hahn, Columbus, OH (US); Gregory P. Tzap, Mt. Laurel, NJ (US)

(73) Assignee: Palmer International, Inc., Skippack, PA (US)

( * ) Notice: Subject to any disclaimer, the term of this patent is extended or adjusted under 35 U.S.C. 154(b) by 307 days.

(21) Appl. No.: 10/607,417

(22) Filed: Jun. 26, 2003

Related U.S. Application Data

(60) Provisional application No. 60/454,065, filed on Mar. 11, 2003.

(51) Int. Cl.
*C11D 1/70* (2006.01)
*C11D 1/72* (2006.01)
*C11D 3/37* (2006.01)
*C07C 43/14* (2006.01)
*C07C 43/164* (2006.01)

(52) U.S. Cl. ..................... 510/475; 568/608
(58) Field of Classification Search ............... 568/608; 510/475
See application file for complete search history.

(56) References Cited

U.S. PATENT DOCUMENTS

| | | | |
|---|---|---|---|
| 2,434,797 A | 1/1948 | Harvey | |
| 2,448,767 A | 9/1948 | Carlson | |
| 2,987,555 A | 6/1961 | Davis | |
| 2,967,892 A | 10/1961 | Smith | |
| 3,046,226 A | 7/1962 | Sandberg et al. | |
| 3,214,406 A | 10/1965 | Sandberg et al. | |
| 3,283,030 A | 11/1966 | Bean, Jr. et al. | |
| 3,644,534 A | 2/1972 | Reabe et al. | |
| 4,310,706 A | 1/1982 | Strege | |
| 5,059,723 A | 10/1991 | Dressler | |
| 5,068,460 A | 11/1991 | Sumner, Jr. et al. | |
| 5,525,201 A | 6/1996 | Diaz-Arauzo et al. | |
| 5,863,524 A * | 1/1999 | Mason et al. | 424/65 |
| 6,229,054 B1 | 5/2001 | Dai et al. | |

FOREIGN PATENT DOCUMENTS

| | | |
|---|---|---|
| GB | 828496 | 2/1960 |
| GB | 2 262 525 A | 12/1991 |

OTHER PUBLICATIONS

"International Cosmetic Ingredient Dictionary", Fifth Edition, vol. 1, p. 532, The Cosmetic, Toiletry, and Fragrance Association, 1993.*

Cashew Nut Shell Liquid, II, an Application of the Prevost Reagent to Alkenyl Phenols, Journal of the American Chemical Society, vol. LXVIII, Jan.-Jul. 1946.

* cited by examiner

*Primary Examiner*—Brian P Mruk
(74) *Attorney, Agent, or Firm*—Flaster/Greenberg PC

(57) ABSTRACT

The invention described herein is a phenolic having a structure represented by formula (I):

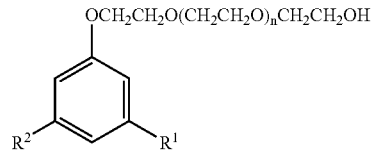

wherein n is an integer of 20 to 200, $R^1$ is an unsaturated hydrocarbon chain, and $R^2$ is selected from the group consisting of a hydrogen atom and $—OCH_2CH_2O(CH_2CH_2O)_nCH_2CH_2OH$. Also described are methods of preparing the compound, pigment dispersions containing the compound, ink and paint compositions containing the compound and methods related thereto.

6 Claims, No Drawings

METHODS OF PREPARATION OF ETHOXYLATED PHENOLIC COMPOUNDS, COMPOSITIONS CONTAINING THE SAME AND RELATED METHODS

CROSS-REFERENCE TO RELATED APPLICATIONS

This application claims priority under 35 U.S.C. § 119(e) to U.S. provisional patent application Ser. No. 60/454,065, filed Mar. 11, 2003, the contents of which are incorporated herein by reference.

BACKGROUND OF THE INVENTION

Surfactants are commonly used as additives in numerous industrial compositions to act as surface active agents. For example, surfactants are often incorporated into printing ink compositions, industrial coating compositions, lubricating oils, wetting agents, and/or paints. In many industrial applications, it may be desirable that the selected surfactant is capable of serving several chemical roles in the composition. Such surfactants are referred to as "multi-purpose surfactants" and include those that may function, for example, as an emulsifier, an oil wetter, a water wetter, a foamer, a defoamer, etc. Use of multi-purpose surfactants allows for several advantages: a reduction in costs of raw materials (fewer to purchase and dispose of), the streamlining of production steps (less additives to incorporate and disperse), and a reduction in duration of the production processes. For at least this reason, there is a need in the art to provide compounds useful as surfactants that may have additional chemical functions within a given composition. There is an additional need for methods of preparing such compounds.

BRIEF SUMMARY OF THE INVENTION

The invention provides methods of preparing an ethoxylated phenolic compound that has numerous utilities and may be used as a multi-purpose surfactant, compositions containing the ethoxylated phenolic compound of the invention, such as dispersions, inks, paints, coatings, metalworking fluids, and lubricating and rolling oils, and methods of preparing these compositions.

In particular, the invention describes methods of preparing an ethoxylated compound, the methods comprising reacting a phenolic reactant that comprises a hydroxyl functional group with ethylene oxide, wherein the resultant ethoxylated compound contains about 50 moles to about 100 moles of ethylene oxide.

Also contemplated within the scope of the invention is an ethoxylated phenolic compound having a structure represented by formula (I):

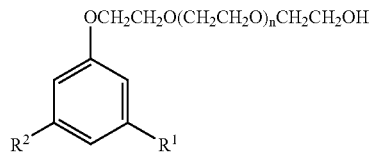

wherein n is an integer of 20 to 200, $R^1$ is an unsaturated hydrocarbon chain, and $R^2$ is selected from the group consisting of a hydrogen atom and $—OCH_2CH_2O(CH_2CH_2O)_nCH_2CH_2OH$. The group represented by $R^1$ may be, for example, $—(CH_2)_7—CH=CH(CH_2)_5CH_3$; $—(CH_2)_{14}CH_3$; $—(CH_2)_7CH=CHCH_2CH=CH(CH_2)_2CH_3$; or $—(CH_2)_7CH=CHCH_2CH=CHCH_2CH=CH_2$.

In another embodiment, the invention includes a pigment dispersion, lubricating fluid, and/or an ink or paint composition comprising a pigment and the ethoxylated phenolic compound of formula (I), as described above, and methods of preparing the pigment dispersion comprising mixing water, pigment, and the ethoxylated phenolic compound.

DETAILED DESCRIPTION OF THE INVENTION

The invention described herein is directed to methods of preparing an ethoxylated phenolic compound that may be used in a wide variety of applications, such as use as a surfactant, a dispersant, a viscosity stabilizer, and a solubility additive. Also described herein is the ethoxylated phenolic compound produced by the methods and compositions containing the ethoxylated phenolic compound of the invention, such as dispersions, inks, paints, coatings, metalworking fluids, and lubricating and rolling oils.

The ethoxylated phenolic compound of the invention is prepared by reacting (i) a phenolic reactant including a compound that has at least one hydroxy (OH) functional group and/or carboxyl (COOH) functional group with (ii) ethylene oxide. The phenolic reactant may be preferably obtained from the saps or resins obtained from members of the anacardiaceae family (including such plants as poison ivy, the cashew nut tree, and the Japanese lac tree).

Preferred for use as the phenolic reactant is cashew nut shell liquid (CNSL), the natural resin found in the honeycomb structure of the cashew nut shell (the shell of the nut of cashew nut trees). A component of CNSL is anacardic acid, which, when treated in the presence of heat, is decarboxylated giving rise to a meta-substituted phenol, 3-pentadecenyl phenol compound (trivial name: cardanol). The related phenol, 5-pentadecadienyl resorcinol, may also be present in CNSL (trivial name: cardol).

In the method of the invention, it is preferred that CNSL contains both cardanol and cardol. Preferably the cardanol: cardol ratio of the CNSL used in the invention is about 50:50 to about 99:1 by weight of the total composition, although ratios of about 80:20 to about 90:10 by weight of the total composition are more preferred, and a ratio of 98:2 is most preferred. Such variations may be accomplished by vacuum distilling raw CNSL to obtain the desired ratio, or by mixing purified fractions of cardol and cardanol, or any other method that is known or to be developed in the art.

Because the precise molecular structures of the cardol and/or cardanol vary depending on the position and amount of unsaturation in the side chains on the phenolic ring, the CNSL used in the method of the invention may preferably contain one or more of the following: 3-pentadecyl phenol; 3-pentadecyl-8' phenol; 3-pentadecyl-8,11' phenol; 3-pentadecenyl-8,11', 14' phenol; m-pentadecyl resorcinol; m-pentadecenyl-8, resorcinol; m-pentadecenyl-8,11' resorcinol; or m-pentadecenyl-8,11', 14' resorcinol.

In the method of the invention, the selected phenolic reactant is reacted with ethylene oxide. It is theorized that, in the process of the invention, the ethylene oxide reacts with the hydroxyl functional group and/or the carboxyl functional group of the phenolic reactant to form a straight chain ethyl ether side chain. In carrying out the reaction, it is preferred that the molar ratio of the phenolic reactant (for example, CNSL) to ethylene oxide is about 1:1 to about 1:200, more preferred that the ratio is about 1:50 to about 1:100, and most preferred that the ratio is about 1:80. As is known to a person of skill, the molar ratio can be varied in order to modify the desired length of the ethyl ether side chain on the resultant ethoxylated phenolic compound, depending on the physical and/or chemical properties desired in the end product. For example, an ethoxylated phenolic compound of the invention having a relatively long side chain will be more soluble in water than one having a relatively shorter side chain.

The method of the invention can be carried out in the presence of a catalyst that has a hydroxyl group and/or carboxyl group. Preferred catalysts include Lewis acids (for example $SnCl_4$ or $BF_3$), alkaline earth hydroxides (for example $Ba(OH)_2$ or $Sr(OH)_2$), potassium hydroxide, sodium hydroxide, acetic acid, and/or mixtures of the same.

Upon completion of the reaction, the reaction catalyst may be neutralized. The reaction product may be purified, if desired, by any means known or to be developed in the art.

The resultant ethoxylated phenolic compound retains an unsaturated hydrocarbon chain at the meta position of the phenol ring and has the structure represented by the formula (I) shown below:

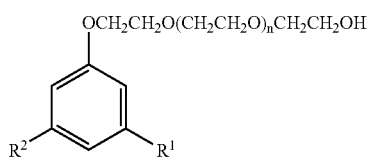

(I)

wherein "n" is an integer of 20 to 200, preferably an integer of 30 to 150, most preferable 50 to 100, and $R^1$ is an unsaturated hydrocarbon chain. For example, $R^1$ may be one of:

—$(CH_2)_7$—CH=CH$(CH_2)_5CH_3$;
—$(CH_2)_{14}CH_3$;
—$(CH_2)_7$CH=CHCH$_2$CH=CH$(CH_2)_2CH_3$; and
—$(CH_2)_7$CH=CHCH$_2$CH=CHCH$_2$CH=CH$_2$.

The group $R^2$ is selected from one of:

—OCH$_2$CH$_2$O(CH$_2$CH$_2$O)$_n$CH$_2$CH$_2$OH; and
—H

The resultant ethoxylated phenolic compound is highly ethoxylated and has a melting point of about 46° C. to about 57° C. (about 115° F. to about 135° F.) and a boiling point of about 330° C. to about 341° C. (about 625° F. to about 650° F.) at one atmosphere.

The compound of the invention may be used as a solubility additive in resin solutions for use in inks, coatings, paints, varnishes, and the like. For example, inclusion of the phenolic ethoxylated compound of the invention in solutions of acrylic or styrene-maleic anhydride resins results in a greater solubility of the resin solution in an aqueous solution.

The compound of the invention may be used as a dispersant and used with a wide range of pigments, as known or to be developed in the art, including: rhodamine red (pigment red 81), carbazole violet (pigment violet 23), metallized azo reds (such as calcium lithol, lithol rubine), diarylide yellows (Yellow 14), monoarylide yellow (Yellow 74), naphthol reds (e.g., Red 22, 122, 2), phthalocyanine blue (blue 15:3 et al.), phthalocyanine green (Green 7), quinacridone red (Red 122), oranges (Orange 5 and 16), methyl violet (Violet 3), and carbon black (both acidic and neutral grades). In general, if used as a pigment dispersion agent, one may incorporate into the composition ethoxylated compound in an amount of about 1% to about 7% by weight of the pigment material present in the total composition. Preferred is about 0.5% to about 2% by weight of the pigment material present in the composition.

EXAMPLE 1

A composition containing the phenolic ethoxylated compound of the invention is prepared. A reaction vessel was charged with vacuum distilled CNSL and ethylene oxide in a molar ratio of 1 to 80, under nitrogen sparge. The catalysts (0.2% acetic acid and 0.1% acetic acid by weight of the reaction mixture) were added.

Upon completion of the reaction, an ethoxylated phenolic compound containing about 60–90 moles of ethylene oxide was produced. The resultant phenolic ethoxylated compound had a melting point of 49° C. (120° F.) and a boiling point of 343° C. (650° F.) at one atmosphere.

The compound had a pH of 6.3 (5% water solution). The compound had acid value of 0.32 and a hydroxyl value of 22.6. The compound exhibited a Gardner color of approximately 5. The compound can be used in dispersion paints, coatings or oils as a surfactant, dispersant, or, oil or water wetter.

EXAMPLE 2

Phthalocyanine Blue Pigment Dispersion

A pigment dispersion for use in ink and coating applications was prepared by incorporating the phenolic ethoxylated compound of the invention and a phthalocyanine blue pigment. The formulation was as follows:

TABLE I

| Component | % by weight of total dispersion |
| --- | --- |
| phthalocyanine blue pigment solution (50% pigment solids suspended in water) | 78.00 |
| phenolic ethoxylated compound (70% solution in water) | 2.85 |
| acrylic copolymer | 7.51 |
| silicone defoamer | 0.64 |
| ammonia | 2.00 |
| water | 9.00 |
| TOTAL | 100.00 |

In the above formulation, the acrylic copolymer was a commercially available product sold under the trade name JONCRYL® 67, available from Johnson Polymer, Inc., Sturtevant, Wis., U.S.A. The silicone defoamer used was a commercially available product sold under the trade name DEE FO PI® 35, available from Ultra Additives, Patterson, N.J., U.S.A. To prepare the pigment solution, water and pigment presscake were combined in an amount to make a 50% solution of pigment.

To prepare the dispersion, all components except the pigment solution, the ammonia, and the acrylic copolymer, were weighed into a blender and mixed approximately thirty seconds to homogenize. The acrylic copolymer was then added, and the mixture was mixed for about two minutes. The ammonia was added and the entire mixture was mixed for an additional five minutes. Finally, the pigment solution was added gradually while mixing. The finished mixture was mixed for approximately ten minutes, and subsequently milled on an Eiger Mini 100 horizontal media mill for approximately twenty minutes.

The resultant dispersion was fluid and exhibited a lesser Brookfield viscosity than a conventional dispersion prepared in the same manner but which did not contain the ethoxylated compound of the invention.

EXAMPLE 3

Carbon Black Pigment Dispersion

A comparison of pigment dispersions for use in ink and coating applications was made by preparing two carbon black dispersions, one that incorporated the compound of the invention and one that did not. First, a dispersion that contained the compound of the invention as prepared according to the formulation shown Table II.

TABLE II

| Component | % by weight of total dispersion |
| --- | --- |
| carbon black pigment | 38 |
| phenolic ethoxylated compound (70% solution in water) | 2.9 |
| acrylic polymer | 28 |
| non-silicone defoamer | 0.25 |
| silicone defoamer | 0.64 |
| water | 30.21 |
| TOTAL | 100.00 |

The acrylic copolymer used in the above formulation is a commercially available material sold under the tradename ESICRYL® 6034 from Johnson Polymer, Inc., Sturtevant, Wis., U.S.A. The non-silicone defoamer used is sold under the tradename SURFYNOL® DF 110L, available from Air Products, Inc., Allentown, Pa., U.S.A. The silicone defoamer was the same as that used in Example 2. The carbon black pigment used was a medium color, furnace process black, in powder form.

To prepare the pigment dispersion, all liquid ingredients of the formulation were weighed into a blender and mixed until blended (approximately thirty seconds). Then the carbon black pigment was added gradually, while mixing. After incorporation of the pigment, this composition was mixed for approximately ten minutes at high shear. The composition was then milled, as described in Example 2.

A second, control composition was prepared, using the same formulation as shown in Table II, with the exception that the ethoxylated phenolic compound of the invention was omitted. The control formulation was prepared in the same manner as described above; however, the resultant mixture was so thick that it could not be milled without the addition of more water. Because of the added water, the pigment load in the control dispersion was reduced to 37.5% by weight of the total dispersion.

An analysis of the viscosity of the control composition and the composition containing the compound of the invention was undertaken. However, the control dispersion was so viscous that a Brookfield viscosity analysis could not be performed. The viscosity of the invention dispersion was approximately 1700 cps (6 r.p.m. at 25° C.).

When each dispersion was incorporated into an identical ink formulation, the ink containing the invention dispersion exhibited high print density and high jetness and good transparency, as compared to the ink prepared using the control dispersion. Color development of the ink containing the invention dispersion was 10% greater than that of the ink that contained the control dispersion.

EXAMPLE 4

Yellow 14 Pigment Dispersion

A yellow-colored pigment dispersion for use in ink and coating applications was prepared by incorporating the compound of the invention and a yellow pigment (yellow 14). The formulation prepared was that of Table III.

TABLE III

| Component | % by weight of total dispersion |
| --- | --- |
| diarylide yellow pigment | 38 |
| phenolic ethoxylated compound (70% solution) | 2.9 |
| acrylic polymer | 28 |
| non-silicone defoamer | 0.25 |
| silicone defoamer | 0.64 |
| water | 30.21 |
| TOTAL | 401.00 |

A control dispersion was also prepared using the formulation of Table III with the exception that the phenol ethoxylated compound was not included. The acrylic polymer and the defoamers used were the same as those in Example 3. The process used to prepare the formulation was that described in Example 3. However, as in the case of the control carbon black dispersion, the viscosity of the control mixture was so great that it could not be milled without the addition of water, which resulted in a reduction of the pigment loading in the control dispersion to 37.5% by weight of the total composition.

Upon analysis, it was determined that the viscosity of the control dispersion exhibited a Brookfield viscosity (at 6 r.p.m. at 25° C.) that was more than ten times greater the viscosity of the invention dispersion.

Inks made using each of the dispersions were also analyzed. The ink that contained the invention dispersion was characterized by a lower pseudoplasticity and lower viscosity that the ink prepared using the control dispersion. However, the ink of the invention demonstrated a better transfer and better transparency than the control ink.

EXAMPLE 5

Automotive Topcoat (Black)

A composition suitable for use as an automotive topcoat was prepared using the ethoxylated compound of the invention. First a pigment dispersion having the formulation as shown in Table IV was prepared.

TABLE IV

| Component | % by weight of total dispersion |
| --- | --- |
| carbon black pigment | 18.5 |
| ethoxylated compound (70% solution) | 7.9 |
| non-ionic detergent (TRITON ® X-114) | 3.5 |
| silicone defoamer (BYK ® 018) | 1.8 |
| water | 68.3 |
| TOTAL | 100.00 |

TRITON® X-114 is a polyoxyethylene ether that can be obtained from Sigma-Aldrich, Inc., St. Louis, Mo., U.S.A. The carbon black pigment used is a high color, furnace process black. The material sold as BYK® 018 was obtained from BYK-Chemie GmbH, Wesel, Germany.

The dispersion was prepared as was described in Example 2, above.

A letdown vehicle for automotive applications was prepared using the formulation as shown in Table V.

TABLE V

| Component | % by weight of total vehicle |
| --- | --- |
| melamine resin | 7.23 |
| propylene glycol-butyl ether | 5.34 |
| polyether modified dimethylpolysiloxane copolymer (BYK ® 308) | 0.25 |
| WITCOBOND ® W-234 | 87.87 |
| TOTAL | 100.00 |

WITCOBOND® W-234 is a modified urethane dispersion available from UniRoyal Chemicals, Inc.

The pigment dispersion was combined with the letdown vehicle in a ratio of approximately thirteen parts letdown vehicle to one part pigment dispersion. The finished automotive topcoat composition had excellent visual characteristics (jet black in appearance and high clarity).

We claim:

1. An ethoxylated phenolic compound having a structure represented by formula (I):

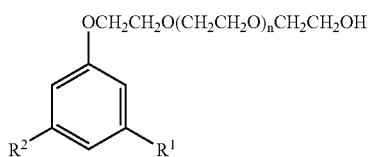

wherein n is an integer of 20 to 200, $R^1$ is an unsaturated hydrocarbon chain, and $R^2$ is selected from the group consisting of a hydrogen atom and —$OCH_2CH_2O(CH_2CH_2O)_nCH_2CH_2OH$.

2. The compound of claim 1, wherein n is an integer of 30 to 150.

3. The compound of claim 1, wherein n is an integer of 50 to 100.

4. A lubricating fluid comprising an ethoxylated phenolic compound having a structure represented by formula (I):

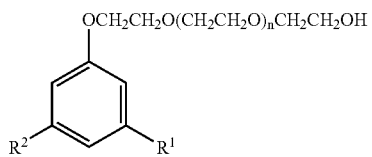

wherein n is an integer of 20 to 200, $R^1$ is an unsaturated hydrocarbon chain, and $R^2$ is selected from the group consisting of a hydrogen atom and —$OCH_2CH_2O(CH_2CH_2O)_nCH_2CH_2OH$.

5. The fluid of claim 4, wherein n is an integer of 30 to 150.

6. The fluid of claim 4, wherein n is an integer of 50 to 100.

* * * * *